United States Patent
Doppler et al.

(10) Patent No.: US 8,966,090 B2
(45) Date of Patent: Feb. 24, 2015

(54) METHOD, APPARATUS AND COMPUTER PROGRAM PRODUCT FOR PROVIDING AN INDICATION OF DEVICE TO DEVICE COMMUNICATION AVAILABILITY

(75) Inventors: Klaus Franz Doppler, Espoo (FI); Mika Rinne, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/424,232

(22) Filed: Apr. 15, 2009

(65) Prior Publication Data

US 2010/0268775 A1  Oct. 21, 2010

(51) Int. Cl.
| G06F 15/16 | (2006.01) |
| G06F 15/177 | (2006.01) |
| H04B 7/00 | (2006.01) |
| H04M 3/00 | (2006.01) |
| H04L 29/08 | (2006.01) |
| H04W 4/00 | (2009.01) |

(52) U.S. Cl.
CPC .............. *H04L 67/322* (2013.01); *H04W 4/00* (2013.01); *H04W 4/005* (2013.01); *H04L 67/10* (2013.01); *H04L 69/32* (2013.01)
USPC ........... 709/227; 709/250; 709/222; 370/310; 455/418

(58) Field of Classification Search
USPC ............ 709/227, 222, 250; 370/310; 455/418
See application file for complete search history.

(56) References Cited

U.S. PATENT DOCUMENTS

| 2002/0059425 A1* | 5/2002 | Belfiore et al. ............... 709/226 |
| 2002/0091863 A1* | 7/2002 | Schug ........................... 709/250 |
| 2002/0120741 A1* | 8/2002 | Webb et al. .................... 709/225 |
| 2003/0048751 A1* | 3/2003 | Han et al. ....................... 370/231 |
| 2003/0217156 A1 | 11/2003 | Datta et al. |
| 2004/0023652 A1* | 2/2004 | Shah et al. .................. 455/426.2 |
| 2004/0023654 A1 | 2/2004 | Jang |
| 2005/0027810 A1 | 2/2005 | Donovan |
| 2005/0033806 A1 | 2/2005 | Harvey et al. |
| 2006/0045098 A1* | 3/2006 | Krause .......................... 370/396 |
| 2007/0008922 A1 | 1/2007 | Abhishek et al. |
| 2009/0011778 A1 | 1/2009 | Jung et al. |

FOREIGN PATENT DOCUMENTS

| CN | 1688984 A | 10/2005 |
| CN | 101340726 A | 1/2009 |

(Continued)

OTHER PUBLICATIONS

International Search Report and Written Opinion for PCT/IB2010/000832 mailed on Aug. 24, 2010; 14 sheets.

(Continued)

*Primary Examiner* — Randodhi Serrao
(74) *Attorney, Agent, or Firm* — Alston & Bird LLP

(57) ABSTRACT

An apparatus for providing an indication of device to device communication capability may include a processor and a memory storing executable instructions. In response to execution of the instructions by the processor, the apparatus may perform at least receiving an indication with respect to status of an application or a request by the application, determining availability of a device to device connection associated with peer communication, and providing a notification to the application indicative of the availability of the device to device connection to the peer. A corresponding method and computer program product are also provided.

17 Claims, 5 Drawing Sheets

(56) References Cited

FOREIGN PATENT DOCUMENTS

| | | |
|---|---|---|
| EP | 1569384 A1 | 8/2005 |
| EP | 2012480 A1 | 1/2009 |

OTHER PUBLICATIONS

Office Action for Korean Application No. 10-2011-7024177; dated Aug. 28, 2013.

European Patent Office, Extended European Search Report for Application No. 10764158.1, Dec. 7, 2012, 6 pages, Germany.

The Korean Intellectual Property Office, Preliminary Office Action for Application No. 10-2011-7024177, mailed Apr. 19, 2013, 4 pages, Korea.

Office Action for Chinese Application No. 201080015178.3 dated Aug. 1, 2014.

Office Action for Chinese Application No. 201080015178.3 dated Nov. 11, 2013.

International Preliminary Report on Patentability for Application No. PCT/IB2010/000832 dated Oct. 18, 2011.

* cited by examiner

METHOD, APPARATUS AND COMPUTER PROGRAM PRODUCT FOR PROVIDING AN INDICATION OF DEVICE TO DEVICE COMMUNICATION AVAILABILITY

TECHNOLOGICAL FIELD

Embodiments of the present invention relate generally to communications technology and, more particularly, relate to apparatuses, methods and computer program products for providing an indication of device to device communication capability.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. In this regard, wireless communication has become increasingly popular in recent years due, at least in part, to reductions in size and cost along with improvements in battery life and computing capacity of mobile electronic devices. As such, mobile electronic devices have become more capable, easier to use, and cheaper to obtain. Due to the now ubiquitous nature of mobile electronic devices, people of all ages and education levels are utilizing mobile terminals to communicate with other individuals or contacts, receive services and/or share information, media and other content.

Communication networks and technologies have been developed and expanded to provide robust support for mobile electronic devices. In this regard, telecommunications technologies aimed at providing wireless data over long distances in a variety of ways, from point-to-point links to full mobile cellular type access are being developed and enhanced. Improvements to the global system for mobile communication (GSM) and the universal mobile telecommunications system (UMTS) along with developments related to the evolved UMTS terrestrial radio access network (E-UTRAN) are also currently being pursued. The E-UTRAN, which is also known as Long Term Evolution (LTE) or 3.9G, is aimed at upgrading prior technologies by improving efficiency, lowering costs, improving services, making use of new spectrum opportunities, and providing better integration with other open standards.

In a typical network configuration mobile users communicate with each other via communication links maintained by the network. In this regard, for example, an originating station may typically communicate data to network devices in order for the network devices to relay the data to a target station. Recently, efforts have been made to provide for device to device (D2D) communication. More particularly, device to device communication may be an important aspect in relation to offloading traffic from an access point and/or improving energy efficiency over only communication through the access point.

Given the recent advances and continued desire for improved communication capabilities, it may be desirable to provide further functionality in relation to the provision of device to device communication.

BRIEF SUMMARY OF EXEMPLARY EMBODIMENTS

A method, apparatus and computer program product are therefore provided that may enable the provision of an indication of device to device communication capability under certain circumstances. Accordingly, for example, a notification may be provided to applications regarding the availability of device to device communication via different communication protocols. Thus, a particular application may be enabled to choose a desirable communication port for use in order to improve user experience in relation to execution of the application based on quality of service (QoS) and time sensitivity issues. In other words, for example, a notification may be provided via an application programming interface (API) of a mobile terminal to indicate the availability of a time sensitive communication link protocol (e.g., via user or universal datagram protocol (UDP)) associated with peer communication that may be selected over an error sensitive communication link protocol (e.g., via transport control protocol (TCP)) associated with network communication by the application.

In one exemplary embodiment, a method of providing an indication of device to device communication capability is provided. The method may include receiving an indication with respect to status of an application or a request by the application, determining availability of a device to device connection for peer communication, and providing a notification to the application indicative of the availability of the device to device connection to the peer.

In another exemplary embodiment, a computer program product for providing an indication of device to device communication capability is provided. The computer program product may include at least one computer-readable storage medium having computer-executable program code instructions stored therein. The computer-executable program code instructions may include program code instructions for receiving an indication with respect to status of an application or a request by the application, determining availability of a device to device connection for peer communication, and providing a notification to the application indicative of the availability of the device to device connection to the peer.

In another exemplary embodiment, an apparatus for providing an indication of device to device communication capability is provided. The apparatus may include a processor and a memory storing executable instructions. In response to execution of the instructions by the processor, the apparatus may perform at least receiving an indication with respect to status of an application or a request by the application, determining availability of a device to device connection for peer communication, and providing a notification to the application indicative of the availability of the device to device connection to the peer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
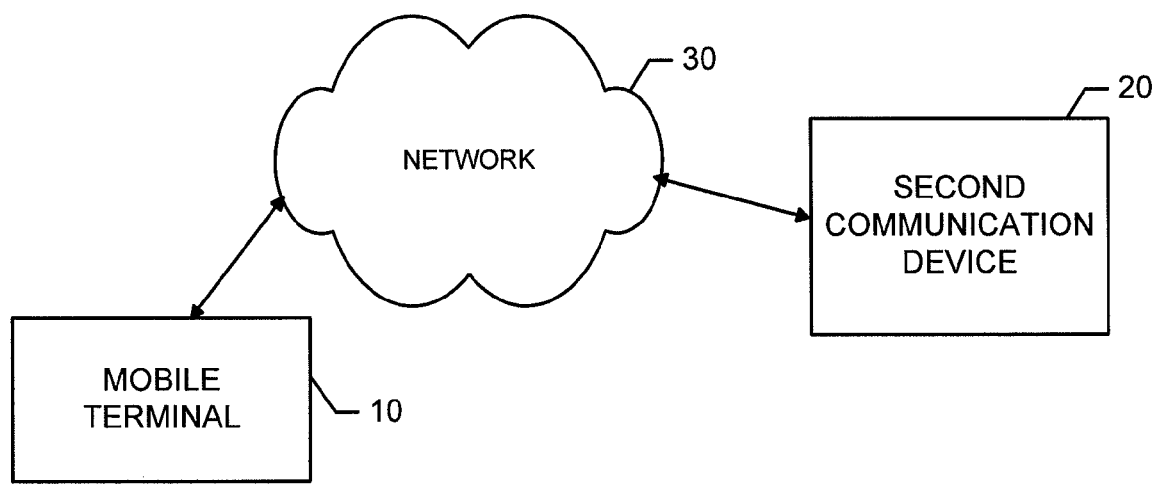
FIG. 1 illustrates one example of a communication system according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Some embodiments of the present invention may provide a mechanism by which improvements may be experienced in relation to providing an indication of device to device communication capability. In this regard, for example, some device to device communication capable radios may allow reliable communication between devices using automatic repeat request (ARQ) retransmissions. Accordingly, an error sensitive communication protocol such as TCP/IP may not be required by applications in order to ensure reliable communications.

TCP/IP was designed as a robust and scalable protocol for the wired internet. In the context of TCP/IP, if a packet is lost or delayed, the system interprets the loss or delay as an indication of congestion and the data rate is reduced. In some cases, a slow start procedure is employed to slowly increment the data rate while monitoring error rates. However, TCP/IP and some other error sensitive communication protocols may not be well suited for wireless communication links in all cases. In this regard, for example, in TCP/IP the loss of packets due to short fading events, interference bursts, handovers, etc., often cause lost packets or increased delays that may cause a slow start procedure, which may reduce system throughput. Typically the radio link recovers from these events and would be able to resume communication at full speed. However, especially because of the slow start procedure, the data rate may increase slowly and the user may experience much lower data rates than the radio link would otherwise offer thereby impacting the user experience for the corresponding application.

TCP provides reliable end-to-end connection over the multiple independent links of the Internet. TCP does not require anything from the links between and operates at least in part based on the reception of acknowledgments (e.g., TCP ack) provided by the receiver to the transmitter. TCP acks therefore drive the aggressiveness of generation of new segments. TCP experiences the paths indirectly by measurements and packet losses. Therefore, TCP operates well in the conditions in which there is no information or imperfect information on the transmission paths.

On the other hand, connectionless protocols (e.g., with respect to a network) such as UDP operate without retransmission mechanisms and therefore may not be considered to offer reliable communications over the networks. Especially in the case of device to device communication, already the radio link protocols can offer reliable communications through radio layer retransmissions. Since the protocol terminating peers are directly involved in communication there may be no need for congestion control algorithms nor transmission control other than provided by the radio protocols and algorithms and an application might benefit if given an opportunity to choose a protocol such as UDP to offer a better user experience or better efficiency.

UDP often operates end to end over connectionless Internet for real time applications, which are not sensitive to rare errors and which do not tolerate retransmission delays. However, in case of direct radio links such as device to device communication, UDP could operate for any media type, because radio link layer protocols are directly in control of radio resources and link properties between their peer entities. Accordingly, information associated with error recovery may be handled in the radio link layer and the UDP port may directly see an error free link without TCP-like probing. Thus, in such an instance, UDP may offer a generic data transmission and segmentation method for device to device communication links. Of course, in both TCP and UDP protocols, a small residual error probability may remain (e.g., due to timers expiring without successful retransmission) for TCP or on the link layer protocol for the UDP port. The application may deal with such errors at its end.

From the perspective of applications being executed at a particular device such as a mobile terminal, radio details are often hidden from the applications and thus, an application cannot take advantage of an available device to device link without setting up a bearer serving the communication port such as UDP port instead of a TCP port based on knowledge of bearer properties provided by embodiments of the present invention. Applications on a mobile device may decide to open a UDP or a TCP port depending on the needs of the application, (e.g., based on whether reliable communication is required) or depending on the bearer properties.

Here we use a broad definition of bearer which includes radio bearers used in current cellular systems such as UMTS as well as radio connectivity provided by for example WiFi networks in infrastructure, ad-hoc or mesh operation mode, bluetooth, ultrawideband or any other radio connectivity. Radio connectivity over the wireless environment between devices includes one directional point-to-point connectivity, birectional point-to-point connectivity, point-to-multipoint broadcast connectivity and multipoint-to-multipoint connectivity i.e. networking and connectivity of nodes over several successive points. The bearer includes all definitions for peer-to-peer relationship that is necessary for the connectivity, i.e. for example the physical layer, the radio link layer and the IP layer that operate as a protocol stack below the communication port.

As such, an API present, for example, in the middleware of the mobile device may enable the application to open a particular port but does not give suggestions to the application as to which port to open or which ports are available. In particular, current APIs typically do not notify the application that there exists radio connectivity with given properties (a.k.a the bearer) which may enable reliable communication also when UDP is employed. Accordingly, some embodiments of the present invention may provide a notification to applications through, for example, an API of a mobile terminal that a wireless (e.g., D2D) link suitable for reliable UDP traffic is available. The application may then be enabled to open a UDP port instead of a TCP port to improve the user experience, to improve the efficiency of connection or to reduce expenses of use. It should be noted, however, that although UDP and TCP will be referenced herein in numerous places, UDP and TCP should be appreciated as representative examples of time sensitive or peer communication protocols and error sensitive or network communication protocols, respectively, and other time sensitive or peer communication protocols and error sensitive or network communication protocols could alternatively be employed in connection with embodiments of the present invention.

FIG. 1 illustrates a generic system diagram in which a device such as a mobile terminal 10, which may benefit from embodiments of the present invention, is shown in an exemplary communication environment. In this regard, the mobile terminal 10 may be configured to integrate a notification about the availability of a reliable wireless link and/or a suggestion about opening an additional time sensitive communication protocol port within an API. As shown in FIG. 1, an embodiment of a system in accordance with an example embodiment of the present invention may include a first communication device (e.g., mobile terminal 10) and a second communication device 20 capable of communication with each via a network 30. In some cases, embodiments of the present invention may further include one or more network devices with which the mobile terminal 10 and/or the second communication device 20 may communicate to provide, request and/or receive information. It should be noted that although FIG. 1 shows a communication environment that may support client/server application execution, in some embodiments, the mobile terminal 10 and/or the second communication device 20 may employ embodiments of the present invention without any network communication. As such, for example, applications executed locally at the mobile terminal 10 and/or the second communication device 20 may benefit from embodiments of the present invention. However, it should be noted that communication techniques such as those described herein can be used not only in embedded devices, but in desktops and servers as well.

The network 30, if employed, may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30.

One or more communication terminals such as the mobile terminal 10 and the second communication device 20 may be in communication with each other via the network 30 or via device to device (D2D) communication and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the mobile terminal 10 and/or the second communication device 20 via the network 30. By directly or indirectly connecting the mobile terminal 10 and/or the second communication device 20 and other devices to the network 30 or to each other, the mobile terminal 10 and/or the second communication device 20 may be enabled to communicate with the other devices or each other, for example, according to numerous communication protocols including Hypertext Transfer Protocol (HTTP) and/or the like, to thereby carry out various communication or other functions of the mobile terminal 10 and the second communication device 20, respectively.

Furthermore, although not shown in FIG. 1, the mobile terminal 10 and the second communication device 20 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 and the second communication device 20 may be enabled to communicate with the network 30 and each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In example embodiments, the first communication device (e.g., the mobile terminal 10) may be a mobile communication device such as, for example, a personal digital assistant (PDA), wireless telephone, mobile computing device, camera, video recorder, audio/video player, positioning device, game device, television device, radio device, or various other like devices or combinations thereof. The second communication device 20 may also be a mobile device such as those listed above or other mobile devices, but could also be a fixed communication device in some instances.

Figure 2:
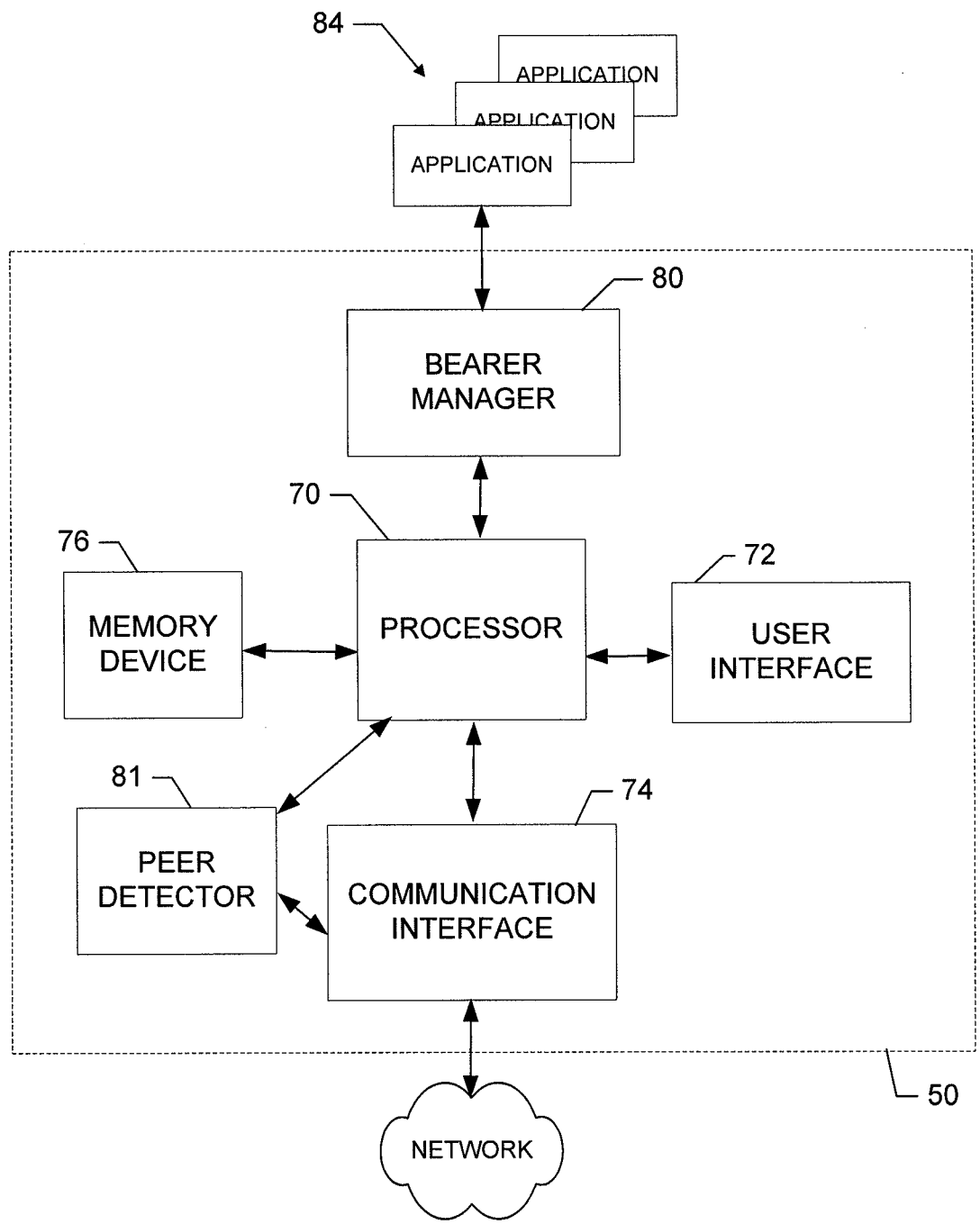
FIG. 2 illustrates a schematic block diagram of an apparatus for providing an indication of device to device communication capability according to an exemplary embodiment of the present invention.

In an exemplary embodiment, either or both of the mobile terminal 10 and the second communication device 20 may be configured to include or otherwise employ an apparatus according to an exemplary embodiment of the present invention. FIG. 2 illustrates a schematic block diagram of an apparatus for providing an indication of device to device communication capability according to an exemplary embodiment of the present invention. An exemplary embodiment of the invention will now be described with reference to FIG. 2, in which certain elements of an apparatus 50 for providing an indication of device to device communication capability are displayed. The apparatus 50 of FIG. 2 may be employed, for example, on a communication device (e.g., the mobile terminal 10 and/or the second communication device 20) or a variety of other devices (e.g., desktops and servers), both mobile and fixed (such as, for example, any of the devices listed above). However, it should be noted that the components, devices or elements described below may not be mandatory and thus some may be omitted in certain embodiments. Additionally, some embodiments may include further components, devices or elements beyond those shown and described herein.

Referring now to FIG. 2, an apparatus for providing an indication of device to device communication capability is provided. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70, which may in some cases otherwise be a general purpose processing element or other functionally configurable circuitry if not for the specific configuration provided by the instructions, to perform the algorithms and/or operations described herein when the instructions are executed. However, in some cases, the processor 70 may be a processor of a specific device (e.g., a mobile terminal or server) adapted for employing embodiments of the present invention by further configuration of the processor 70 by instructions for performing the algorithms and/or operations described herein.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device (e.g., the mobile terminal 10), the user interface 72 may include, among other devices or elements, any or all of a speaker, a microphone, a display, and a keyboard or the like.

In an exemplary embodiment, the processor 70 may be embodied as, include or otherwise control a bearer manager 80. The bearer manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the bearer manager 80 as described below. Thus, in examples in which software is employed, a device or circuitry (e.g., the processor 70 in one example) executing the software forms the structure associated with such means. In this regard, for example, the bearer manager 80 may be configured to provide, among other things, for receiving an indication with respect to status of an application, determining availability of a device to device connection associated with a time sensitive communication protocol for providing information to the application, and providing a notification to the application indicative of the availability of the device to device connection associated with the time sensitive communication protocol and/or the availability of a connection (bearer) suitable for a time sensitive communication protocol.

Figure 3:
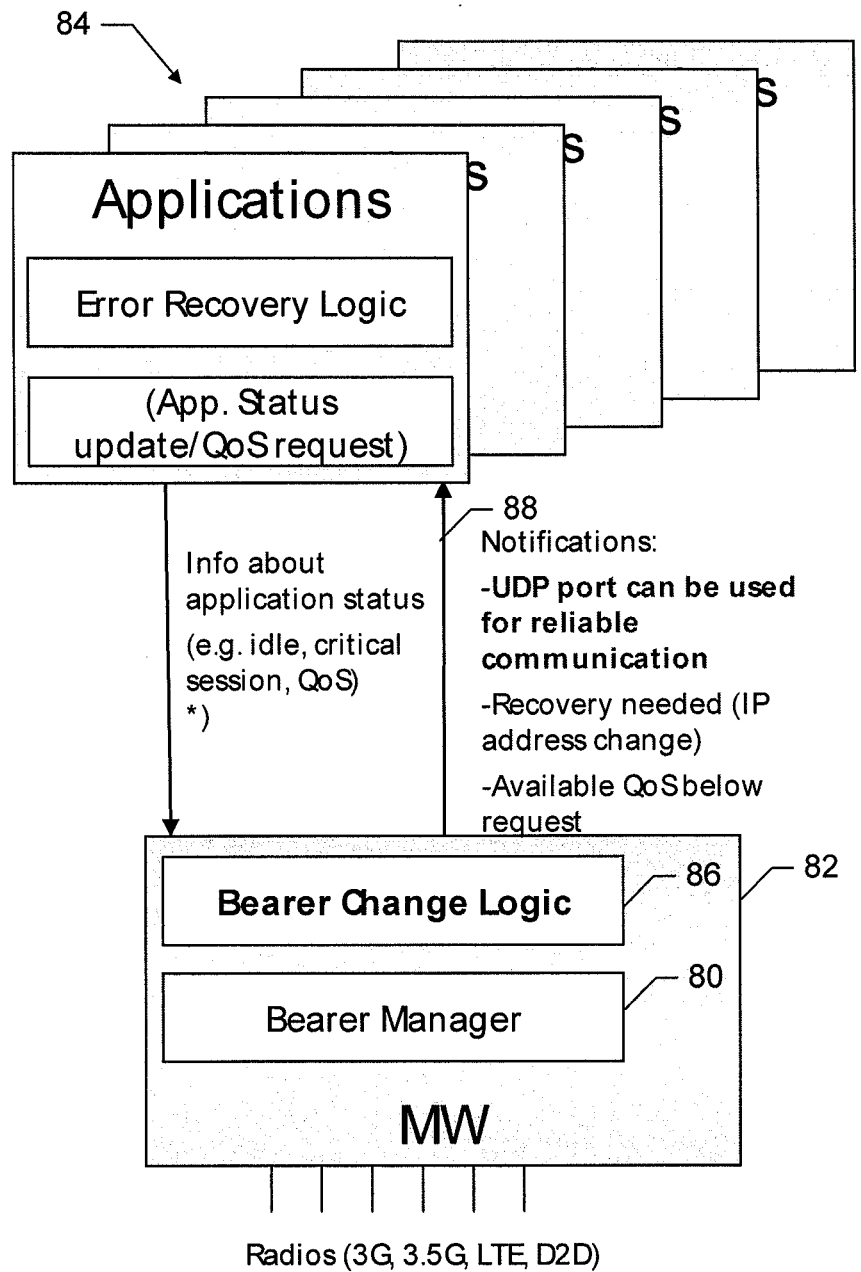
FIG. 3 is a block diagram of an example illustration of radio bearer selection by a bearer manager according to an exemplary embodiment of the present invention.

In an exemplary embodiment, the bearer manager 80 may be included in or otherwise in communication with middleware 82 (e.g., software sitting between applications and the operating system of a device to provide some common functionality to the applications) within the mobile terminal 10 and/or the second communication device 20. FIG. 3 illustrates an example illustration of radio bearer selection by the bearer manager 80 in accordance with an exemplary embodiment. As shown in FIG. 3, the middleware 82 may be structurally installed between the radio functionality of the device in which the middleware 82 is instantiated (e.g., the mobile terminal 10 and/or the second communication device 20) and various applications 84 that may be executed by the device. An exemplary embodiment of the present invention will now be described in reference to FIGS. 2 and 3 in which the applications 84, the middleware 82 and/or the bearer manager 80 are described as actors. As such, it should be appreciated that in some instances the actions taken by any of the actors described herein may be taken in the process of or as a result of the execution of actions or instructions by processing circuitry associated with the actors described above (e.g., the processor 70).

In an exemplary embodiment, the apparatus 50 (e.g., via the middleware 82) may also include a peer detector 81. The peer detector 81 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the peer detector 81 as described herein. In this regard, the peer detector 81 may be configured to operate via the communication interface 74 in order to detect peer devices with which ad hoc device to device connections may be established. As such, if the peer detector 81 detects that a peer device is available via which a device to device connection may be established to employ a time sensitive communication protocol (e.g., UDP), the peer detector 81 may inform the bearer manager 80 of the availability and the bearer manager 80 may thereafter provide a notification of the availability to the application as described herein.

In operation according to an exemplary embodiment, the middleware 82 (e.g., via the bearer manager 80) may be configured to select one or more radio bearers from among those radio bearers that are available. As such, the middleware 82 (e.g., via the peer detector 81 and other radio detection circuitry) may be configured to detect and or determine radio technologies (e.g., 3G, 3.5G, LTE, D2D, etc.) that are available and by which communication may be established. The selection may be made, for example, based on application status information such as QoS requirements, idle state, session criticality, etc., received from an application (among the applications 84) or based upon a request from the application. The middleware 82 may also be configured to change the bearer if a new one is available (e.g. if a D2D link is available for establishment). In some cases, a change of the radio bearer may cause a change of the IP address. If so, the middleware 82 may be configured to notify the application that the IP address has changed and the application can recover from IP address change event (e.g., via error recovery logic). In an exemplary embodiment, the changing of a bearer may be accomplished by bearer change logic 86 that may form a portion of or be in communication with the middleware 82. The bearer change logic 86 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the corresponding device or circuitry to perform the corresponding functions of the bearer change logic 86 including adding, removing or replacing a bearer responsive to bearer selections made by the middleware 82.

In an exemplary embodiment, the bearer change logic 86 may be configured to setup communication links via selected communication ports. For example, the bearer change logic 86 may be configured to setup D2D links selected by the bearer manager 80 based on information received from the application. Furthermore, the bearer change logic 86 may be configured to open communication ports for setting up communication links. In this regard, for example the bearer change logic 86 may be configured to setup communication links via time sensitive communication protocol ports (e.g., UDP ports) or error sensitive communication protocol ports (e.g., TCP ports), in some cases, based on settings at the applications 84 or based upon selections or requests made by the applications 84.

In an exemplary embodiment, the bearer manager 80 may be configured to provide a notification (shown, as an example, by arrow 88) to one or more of the applications 84 regarding communication setup options. In this regard, for example, the bearer manager 80 may be configured to generate a notification that a time sensitive communication protocol port (e.g., a UDP port) is available for reliable communication if, for example, a reliable D2D link is selected by the bearer manager 80. The application may then respond to the notification by opening or requesting the opening of a UDP port instead of a TCP port (or by opening a UDP port in addition to an already open communication port, or switching from a TCP port to a UDP port, etc.). In this regard, UDP may be better suited for wireless links in some situations, since UDP does not adjust its transmission rate because of delayed packets due to fading or handovers. TCP would interpret fading and handover events as congestion and start a recovery procedure (e.g., slow start), which may greatly reduce the data rate and thus the user experience. Accordingly, the configuration of the bearer manager 80 to provide a notification to the application with respect to the availability of alternative communication capabilities involving a different communication protocol than the otherwise currently employed error sensitive communication protocol may improve user experience be reducing delay for time sensitive applications and by increasing the throughput.

The operation of the bearer manager 80 with respect to providing a notification may occur either at initial execution of an application (e.g., in order to provide the application with options to enable the application to select a bearer of choice) or during execution of an application (e.g., in response to detection of a peer device that may be used to establish a reliable communication link via a device to device connection.

Figure 4:
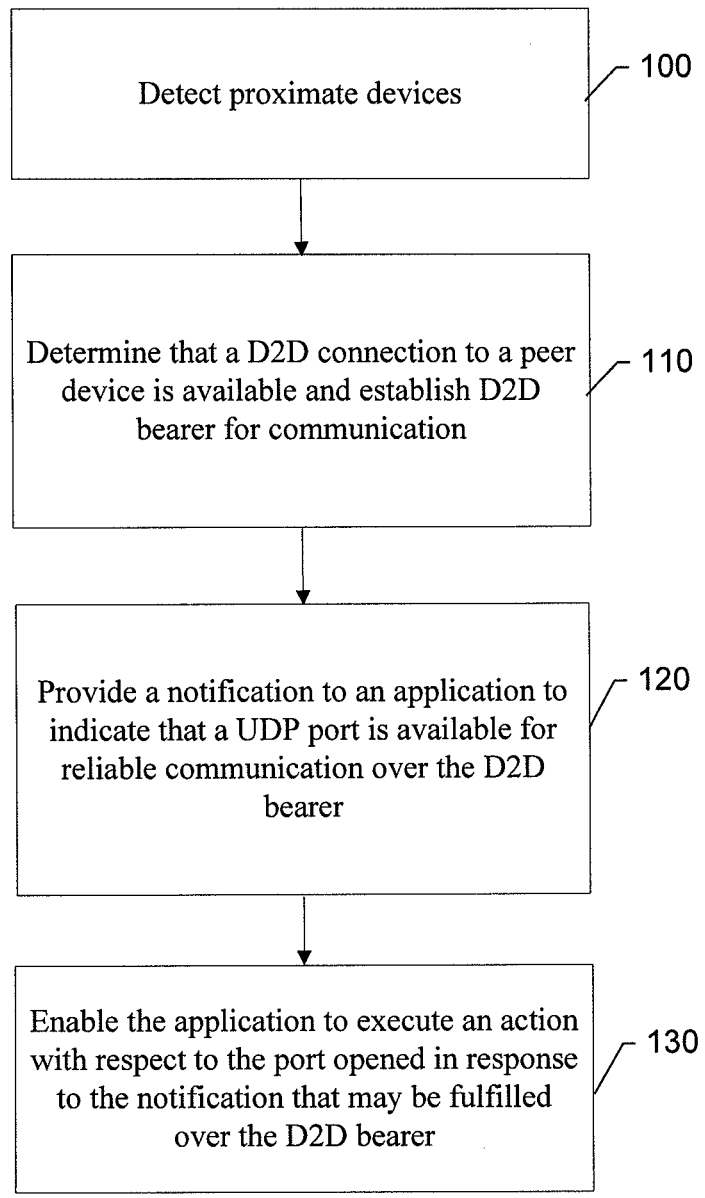
FIG. 4 illustrates a flow diagram of operation according to an exemplary embodiment of the present invention.

In an exemplary embodiment, the notification provided by the bearer manager 80 may be an integral part of the API of the device in which the bearer manager 80 is installed (e.g., the mobile terminal 10 and/or the second communication device 20). By integrating functionality associated with notification generation within the API, notifications may be made available to all applications 84. The flowchart in FIG. 4 illustrates an exemplary series of operations associated with providing notifications to applications and potential responses to the notifications provided. At operation 100, proximate devices may be detected within communication range with the device employing the bearer manager 80 (e.g., the mobile terminal 10 or the second communication device 20). In response to the detection of one or more devices, the bearer manager 80 may determine that a D2D connection to a peer among the detected devices is available and establish a D2D bearer for communication thereto at operation 110. The bearer manager 80 then provides a notification to an application to indicate that a UDP port is available for reliable communication over the D2D bearer at operation 120. The bearer manager 80 may then enable the application to execute an action with respect to the port (e.g., that was opened in response to the notification) that may be fulfilled over the D2D bearer at operation 130. In an exemplary embodiment, the application may decide to open a UDP port instead of a TCP port or open the UDP port in addition to other ports open and use multiple ports. As another alternative, the application may decide to ignore the notification.

In an exemplary embodiment, the notification may be provided by a signal generated in the local API based on discovery of an availability of a new communications connection, which may be considered reliable although not an error sensitive communication protocol (e.g., TCP). The new communications connection (e.g., a time sensitive communication protocol port such as a UDP port) may therefore be recommended, by virtue of the provision of the notification, for use by the application when utilizing the new communications connection or link. When receiving the notification, the application may choose its functionality freely among various exemplary options, some of which are listed below.

1) The application may omit the notification and continues using the ports it has already in use.
2) The application may open a new TCP port as a new communication connection, despite the UDP recommendation. If opened, the application may then decide how to use multiple ports it has opened as described below.
3) The application may open a new UDP port as recommended and decide how to use the open ports as described below.

4) The application may open a new port and tests its communication connection and then decide to close (at least some of) the earlier opened ports.

Operation with multiple ports may be conducted in some situations, as indicated above. In situations in which an application has multiple ports open for multiple communication connections, the application may select a manner by which to utilize the open ports. In an exemplary embodiment, the application may test the new communication connection in terms of a commonly available throughput measure and, in response to a determination that the new port has a higher throughput than an old port, the application may shift to using the new port. The bearer control logic 86 may provide access to ports selected for use by the application. In some cases, the application may permanently shift to the new port. However, the application may alternatively decide to continue using the new port only for as long as it appears to be overperforming relative to other ports or a formerly used port. As such, in response to the throughput on a new port dropping to a level below the throughput provided by a formerly used port (e.g., hysteresis), the application may switch back to the previously used communication connection in the formerly used port and determine whether the formerly used port has performance that is competitive.

In some cases where multiple ports are open, the application may be configured to make decisions on a packet flow basis. In this regard, for example, some flows may be directed to a newly opened communication connection and some flows may be connected to an earlier opened communication connection. When a new flow is born, the application may make a decision as to which communication port to employ and utilize the decided upon communication port until flow termination, and then decide again for each subsequent flow that is born or established. Alternatively, the application may do port switching during an established flow, for example, if flows are long lasting and gains are expected. Switching ports for existing flows may be useful in a case where the communication flow in a particular port appears to be congested, slow or stuck and the application may otherwise face the risk of getting terminated due to the performance of the existing flow's communication port. Opening a new communication connection via a new port may refresh the application with new data and enable recovery from the stopped or reduced flow situation.

Some of the examples mentioned above may require sophisticated segment handling by the application in order to combine packet flows. However, the application can be assumed to survive well with the existing segmentation schemes, because both TCP and UDP have their own independent segmentation schemes and Segment Numbers. The application layer protocol is by default capable of handling ports it has opened and the application protocol may provide instructions on how to handle data on top of these protocols.

In some embodiments, performance measures may be instituted in the application layer and the application may utilize performance measures as a basis for decision making with respect to how to handle its open ports or ports it has the option of opening or closing. In this regard, for example, applications may be configured to provide the user with an indication as to the throughput (e.g., in kbps) or provide the user with estimates of action completion times or status reports (e.g., 5 mins left for download or 78% done). The performance measures may be calculated based on data transmitted and/or received in a particular port. Using the performance measures, the application may be enabled to compare various ones of the communication connections available such as, for example, at an existing TCP port and a newly opened communication connection at a UDP port.

In an exemplary embodiment, properties of a link layer D2D protocol may include a variable segment size according to an amount of data in a UDP transmitter buffer. Since radio resources are flexible, situational information describing conditions at a receiver buffer may directly guide a corresponding transmitter buffer. As such, situational data indicating how much data the receiver buffer can receive and/or at what data rate such data could be received may provide guidance for a corresponding transmitter buffer. Implementation of the link layer D2D protocol may include use of buffer status reports, which may operate at the MAC (media access control) layer and which may be invisible to the UDP protocol as such. The MAC of the transmitter may be enabled to locally trigger its UDP packet queue and make an effort to empty the queue quickly based on the receiver's capability for receiving. The UDP protocol may, in this case, see the link performance as the derivative of the peer to peer MAC performance.

In link errors, the physical layer and/or MAC layer retransmissions can operate based on their receive segment windows. The segment number may be set to be larger than the length of the retransmission processes in order to allow reordering and in-order delivery to the UDP. Accordingly, embodiments of the present invention may provide for an ability to provide a notification to applications as to available communication link options for respective applications based on the application status of each application. In this regard, for example, middleware may be provided with the capability of providing such a notification to make it easy for application developers to select a port that may offer the best user experience for the application. The application may then be enabled to open standard TCP/IP or UDP/IP ports or sockets for use and described herein.

Thus, some embodiments of the present invention provide mechanisms by which any local resources that appear via an ad hoc nature can become available for the application. As such, the devices in a local environment may be detected by a radio apparatus and a communication link can be established among them. The application may be provided with a notification of the existence of such communication connections and be enabled to open a UDP port for this communication. Hence, embodiments of the present invention apply not only for device-to-device communications but to any resources that are available in the local surroundings. The device-to-device connection is capable of pointing peer applications or peer resources in the remote device by its Uniform Resource Identity (URI), Uniform Resource Name (URN) or Uniform Resource Location (URL). Accordingly, pointing the peer devices by the internet address or the Ethernet MAC address are examples that are naturally in the scope of embodiments of the present invention.

Figure 5:
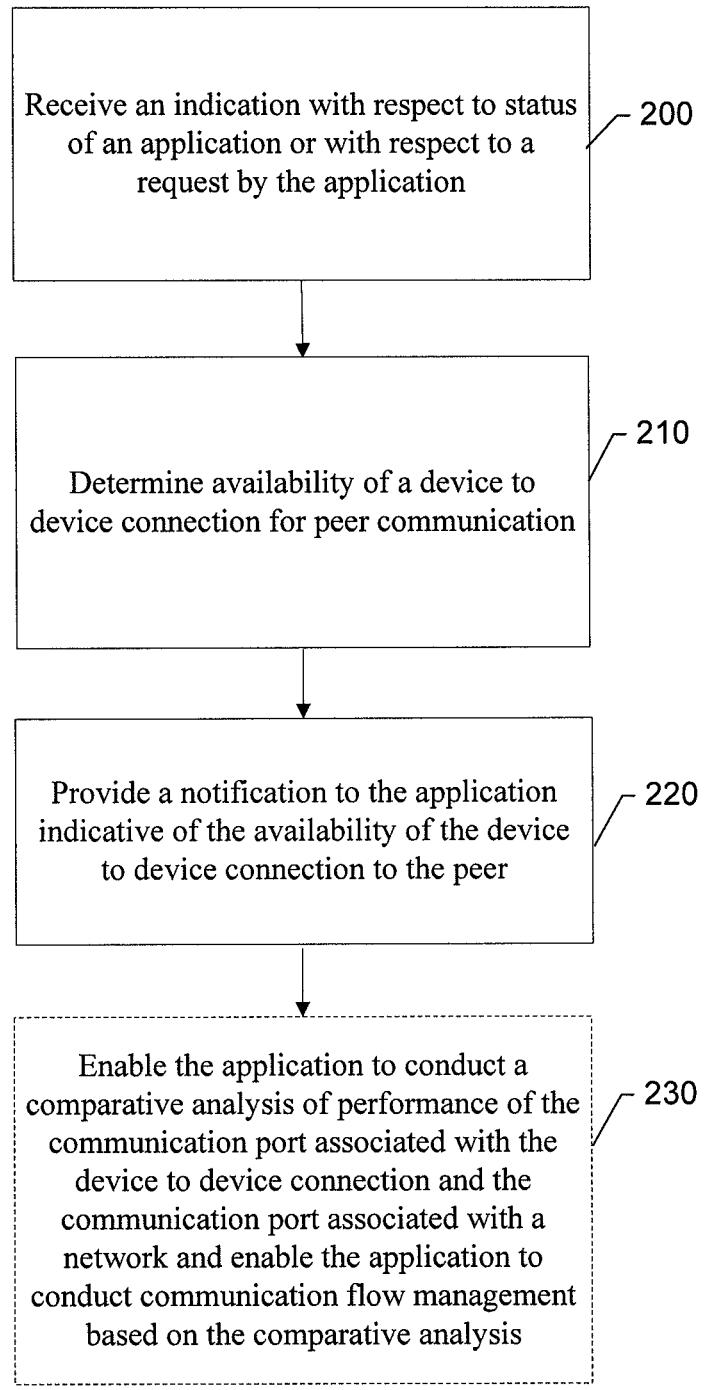
FIG. 5 illustrates a flowchart of a method of providing an indication of device to device communication capability in accordance with an exemplary embodiment of the present invention.

FIG. 5 is a flowchart of a system, method and program product according to exemplary embodiments of the invention. It will be understood that each block or step of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or network device and executed by a processor in the mobile terminal or network device. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s) or step(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing an indication of device to device communication capability, as shown in FIG. 5, includes receiving an indication with respect to status of an application at operation 200. In some cases, operation 200 may alternatively or additionally include receiving an indication with respect to a request by the application. The method may further include determining availability of a device to device connection for peer communication at operation 210. The method may further include providing a notification to the application indicative of the availability of the device to device connection to the peer at operation 220.

In some embodiments, certain ones of the operations above may be modified or further amplified as described below. In this regard, for example, receiving the indication may include receiving the indication in relation to an application having a network connection already established. In some cases, determining the availability of the device to device connection for peer communication may include determining the availability of a user datagram protocol (UDP) port for serving the application. In an exemplary embodiment, providing the notification may include enabling the application to open a communication port associated with the peer communication instead of a communication port associated with the network connection, to open a communication port associated with the peer communication in addition to a communication port associated with the network connection, or to ignore the notification. In some cases, providing the notification may include providing the notification via an application programming interface.

In some cases, optional additional operations may be included. An example of such an additional operation is shown in dashed lines in FIG. 5. It should be appreciated that each of the modifications or amplifications herein may be included with the operations and modifications above either alone or in combination with any others among the features described herein. In this regard, in an exemplary embodiment the method may further include enabling the application to conduct a comparative analysis of performance of the communication port associated with the peer connection and the communication port associated with the network connection and enabling the application to conduct communication flow management based on the comparative analysis at operation 230.

In an exemplary embodiment, an apparatus for performing the method of FIG. 5 above may comprise a processor (e.g., the processor 70) configured to perform some or each of the operations (200-230) described above. The processor may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-230 may comprise, for example, the processor 70, the bearer manager 80, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a memory storing executable instructions that in response to execution by the processor cause the apparatus to at least perform the following:

receiving an indication with respect to a status of an application or a request by the application, the application being executed by the apparatus;

detecting one or more devices that are proximate to the apparatus;

determining availability of a device to device connection for peer communication between the apparatus and the one or more devices that are proximate to the apparatus by determining the availability of a user datagram protocol port for serving the application instead of or in addition to a transport control protocol port;

causing a notification to be provided to the application indicative of the availability of the device to device connection between the apparatus and the one or more devices that are proximate to the apparatus, wherein the notification is indicative of the availability of the user datagram protocol port; and enabling the application to open a communication port of the apparatus associated with peer communication.

2. The apparatus of claim 1, wherein the instructions cause the apparatus to receive the indication in relation to an application having a network connection already established.

3. The apparatus of claim 1, wherein the instructions further cause the apparatus to enable the application to open a communication port associated with peer communication instead of a communication port associated with a network connection.

4. The apparatus of claim 1, wherein the instructions further cause the apparatus to enable the application to open a communication port associated with peer communication in addition to a communication port associated with a network connection.

5. The apparatus of claim 4, wherein the instructions further cause the apparatus to enable the application to conduct a comparative analysis of performance of the communication port associated with peer communication and the communication port associated with the network connection and enable the application to conduct communication flow management based on the comparative analysis.

6. The apparatus of claim 1, wherein the instructions further cause the apparatus to provide the notification via an application programming interface.

7. A method comprising:
receiving, at an apparatus comprising a processor, an indication with respect to a status of an application or a request by the application, the application being executed by the apparatus;
detecting, by the apparatus, one or more devices that are proximate to the apparatus;
determining availability of a device to device connection for peer communication between the apparatus and the one or more devices that are proximate to the apparatus by determining the availability of a user datagram protocol port for serving the application instead of or in addition to a transport control protocol port;
causing, via the processor, a notification to be provided to the application indicative of the availability of the device to device connection between the apparatus and the one or more devices that are proximate to the apparatus, wherein the notification is indicative of the availability of the user datagram protocol port; and
enabling the application to open a communication port of the apparatus associated with peer communication.

8. The method of claim 7, wherein receiving the indication comprises receiving the indication in relation to an application having a network connection already established.

9. The method of claim 7, wherein providing the notification comprises enabling the application to open a communication port associated with peer communication instead of a communication port associated with a network connection.

10. The method of claim 7, wherein providing the notification comprises enabling the application to open a communication port associated with peer communication in addition to a communication port associated with a network connection.

11. The method of claim 10, further comprising enabling the application to conduct a comparative analysis of performance of the communication port associated with peer communication and the communication port associated with the network connection and enabling the application to conduct communication flow management based on the comparative analysis.

12. The method of claim 7, wherein providing the notification comprises providing the notification via an application programming interface.

13. A computer program product comprising at least one non-transitory computer-readable storage medium having computer-executable program code portions stored therein, wherein the computer-executable program code portions are configured to, upon execution, cause an apparatus to at least perform:
receiving an indication with respect to a status of an application or a request by the application, the application being executed by the apparatus;
detecting one or more devices that are proximate to the apparatus;
determining availability of a device to device connection for peer communication between the apparatus and the one or more devices that are proximate to the apparatus by determining the availability of a user datagram protocol port for serving the application instead of or in addition to a transport control protocol port;
causing a notification to be provided to the application indicative of the availability of the device to device connection between the apparatus and the one or more devices that are proximate to the apparatus, wherein the notification is indicative of the availability of the user datagram protocol port; and
enabling the application to open a communication port of the apparatus associated with peer communication.

14. The computer program product of claim 13, wherein receiving the indication comprises receiving the indication in relation to an application having a network connection already established.

15. The computer program product of claim 13, wherein providing the notification comprises enabling the application to open a communication port associated with peer communication instead of a communication port associated with a network connection.

16. The computer program product of claim 13, wherein providing the notification comprises enabling the application to open a communication port associated with peer communication in addition to a communication port associated with a network connection.

17. The computer program product of claim 16, further comprising computer-executable program code instructions configured to, upon execution, enable the application to conduct a comparative analysis of performance of the communication port associated with peer communication and the communication port associated with the network connection and enabling the application to conduct communication flow management based on the comparative analysis.

* * * * *